United States Patent
Hausmann et al.

(10) Patent No.: US 10,371,058 B2
(45) Date of Patent: Aug. 6, 2019

(54) OPERATION OF A GAS TURBINE COMPRISING AN INTERPOLATED OPERATING CURVE DEVIATION

(71) Applicant: Siemens Aktiengesellschaft, Munich (DE)

(72) Inventors: Kai Hausmann, Mülheim (DE); Carsten Seiler, Recklinghausen (DE); Dirk Wall, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/576,962

(22) PCT Filed: Apr. 20, 2016

(86) PCT No.: PCT/EP2016/058703
§ 371 (c)(1),
(2) Date: Nov. 27, 2017

(87) PCT Pub. No.: WO2016/192890
PCT Pub. Date: Dec. 8, 2016

(65) Prior Publication Data
US 2018/0156127 A1 Jun. 7, 2018

(30) Foreign Application Priority Data
Jun. 3, 2015 (EP) .................... 15170417

(51) Int. Cl.
*F02C 9/26* (2006.01)
*F02C 9/28* (2006.01)
*F02C 7/228* (2006.01)

(52) U.S. Cl.
CPC .............. *F02C 7/228* (2013.01); *F02C 9/26* (2013.01); *F02C 9/28* (2013.01);
(Continued)

(58) Field of Classification Search
CPC .......... F02C 9/26; F02C 9/28; F23N 2041/20; F23N 2025/08; F05D 2270/335; F05D 2270/303
See application file for complete search history.

(56) References Cited

U.S. PATENT DOCUMENTS 7,610,746 B2 * 11/2009 Fujii .................. F02C 9/28
60/39.281
2007/0089395 A1 3/2007 Fujii et al.
(Continued)

FOREIGN PATENT DOCUMENTS

DE 102006008483 A1 3/2007
EP 2071157 A1 6/2009
(Continued)

OTHER PUBLICATIONS

EP Search Report dated Dec. 10, 2015, for EP patent application No. 15170417.8.
(Continued)

*Primary Examiner* — William H Rodriguez
*Assistant Examiner* — Thuyhang N Nguyen
(74) *Attorney, Agent, or Firm* — Beusse Wolter Sanks & Maire

(57) ABSTRACT

An operating method for a gas turbine by partial-load operation, includes setting of a power setpoint value for a predefined temperature value; determining the two operating curves as a function of temperature according to the power of the gas turbine, wherein the power setpoint value is located between said operating curves; determining the difference in power of said two operating curves at the substantially constant predetermined temperature value; determining a power deviation from the predetermined power setpoint value of one of the two operating curves at the substantially constant predetermined temperature value; calculating an interpolated operating curve deviation on the
(Continued)

basis of the difference in power and the power deviation, wherein the temperature is a turbine outlet temperature or a computationally determined turbine inlet temperature.

19 Claims, 2 Drawing Sheets

(52) U.S. Cl.
CPC .... *F05D 2270/053* (2013.01); *F05D 2270/10* (2013.01); *F05D 2270/14* (2013.01); *F05D 2270/303* (2013.01); *F05D 2270/309* (2013.01); *F05D 2270/335* (2013.01); *F05D 2270/701* (2013.01); *F05D 2270/708* (2013.01); *F23N 2025/08* (2013.01); *F23N 2041/20* (2013.01)

(56) References Cited

U.S. PATENT DOCUMENTS

| | | |
|---|---|---|
| 2009/0150040 A1 | 6/2009 | Rofka et al. |
| 2013/0167549 A1 | 7/2013 | Holcomb et al. |
| 2013/0227954 A1 | 9/2013 | Marini et al. |
| 2017/0074175 A1 | 3/2017 | Uyama et al. |

FOREIGN PATENT DOCUMENTS

| | | |
|---|---|---|
| JP | 2002206430 A | 7/2002 |
| WO | 2015146994 A1 | 10/2015 |

OTHER PUBLICATIONS

International Search Report dated Aug. 3, 2015, for PCT/EP2016/058703.

* cited by examiner

OPERATION OF A GAS TURBINE COMPRISING AN INTERPOLATED OPERATING CURVE DEVIATION

CROSS REFERENCE TO RELATED APPLICATIONS

This application is the US National Stage of International Application No. PCT/EP2016/058703 filed 20 Apr. 2016, and claims the benefit thereof. The International Application claims the benefit of European Application No. EP15170417 filed 3 Jun. 2015. All of the applications are incorporated by reference herein in their entirety.

FIELD OF INVENTION

The present invention relates to an operating method for a gas turbine during partial load operation.

BACKGROUND OF INVENTION

Gas turbines, during such a partial load operation, typically follow a pre-programmed control system with suitable control parameters which for example can also be provided as an operating curve over a greater operating range. Therefore, for example during a so-called power operation, that is to say an operation during which the delivered power output of the gas turbine is provided as a control parameter, a set of operating curves can be predetermined in the control system in which predetermined temperature values are associated with selected power output values of the gas turbine. This temperature value corresponds to a temperature value which is relevant for determining the power output of the gas turbine, wherein this for example can be the turbine inlet temperature or the turbine exit temperature. The relevant operating curves serve as reference values during the power operation, by means of which a desired power output value can be established. In other words, these operating curves serve as a set of control setpoint values to which the gas turbine control system adjusts the power output value.

In addition to such temperature values, such operating curves, however, can for example also include operating parameters with regard to the position of a variable compressor guide baffle (compressor guide vanes), as well as other operating parameters, for example a quantity of water injected into the gas turbine or the distribution of the fuel quantity to individual burners or burner stages in the gas turbine in order to suitably adjust the power output of the gas turbine.

The operating curves are typically established individually in the gas turbines for the most diverse operating behaviors and stored in the control system of the gas turbine. The operating curves are determined in this case in such a way that at each point of the operating curve a stable operation of the gas turbine can be carried out. In particular, the specific distribution of fuel to different burners of the gas turbine is stored in the individual operating curves as an operating parameter and typically does not alter, or alters only marginally, inside an operating curve. If now the operation of a gas turbine is to be altered along a predetermined first operating curve to the effect that this is carried out according to a second operating curve which deviates from the first, a change between these operating curves is required. If the two relevant operating curves lie comparatively close together, a direct changeover between first operating curve and second operating curve can possibly be undertaken without instabilities in the operation of the gas turbine being expected. If, however, the two operating curves lie comparatively far apart, the gas turbine, on account of this change, can be transferred into an unstable operating range which in the worst case even leads to an emergency shutdown of the gas turbine.

In the prior art, such as in EP 2 071 157 A1, the change between such operating curves is indeed described but according to this prior art the problems of unstable operating modes during the change between individual operating curves cannot be adequately taken into account. Therefore, for example EP 2 071 157 A1 teaches an optional change between individual operating curves but without specifying that an unstable operation can be the consequence on account of the new operating parameters possibly applying to the new operating curve.

Particularly on account of the different distribution of fuel to the individual burners or burner stages of the gas turbine between two operating curves, during a change between two operating curves comparatively abrupt changes in the combustion chamber can take place, which allow the gas turbine operation to at least temporarily become unstable. During operation along an operating curve, an operating point is indeed typically kept largely stable as a result of suitable controlling of the gas turbine, but this controlling is for the most part only designed for the compensation of smaller deviations. Small deviations along an operating curve mostly behave in a problem free manner in this respect. However, deviations which during the operation occur over a multiplicity of operating curves can sometimes adjust the gas turbine control system without freedom of problems.

DE102006008483A1 teaches another approach to this, according to which valve position command values of fuel flow quantity control valves are to be determined based on the fuel gas ratio (such as a pilot ratio, a cylinder ratio and a main ratio) of a gas turbine. In this case, the opening degree of inlet guide vanes can for example also be calculated in a targeted manner by means of linear interpolation so that a turbine inlet temperature of 1500° C. results. For the interpolation, provision is made in this case for table values which at points relate certain opening degrees to the power output of the gas turbine and to the inlet air temperature. However, disadvantageous to this approach is that no operating curve dependent operation of the gas turbine is enabled.

SUMMARY OF INVENTION

In this respect, the technical requirement arises to specify a suitable operating behavior for a gas turbine during partial load operation which can avoid the disadvantages which are known from the prior art. Particularly to be specified is an operating behavior for a gas turbine which can also undertake the change between individual operating curves of the gas turbine control system in a largely controlled and problem free manner. In other words, in the event of jumps between two operating curves, which typically cannot be undertaken in a problem free manner without furthermore provisions, the control system is also to be in the position to still allow these to take place in a controlled and stable manner.

These objects upon which the invention is based are achieved by means of an operating method for a gas turbine during partial load operation and also by means of a gas turbine control system as well as by means of a gas turbine according to the claims.

The objects upon which the invention is based are especially achieved by means of an operating method for a gas turbine during partial load, comprising the following steps: —specifying a power output setpoint value at a predetermined temperature value; —determining two operating curves of the temperature as a function of the power output of the gas turbine, wherein the power output setpoint value is arranged between these operating curves; —determining the power output difference of these two operating curves at the essentially constant, predetermined temperature value; —determining a power output deviation of the predetermined power output setpoint value from one of the two operating curves at the essentially constant, predetermined temperature value; —calculating an interpolated operating curve deviation on the basis of the power output difference and the power output deviation, wherein the temperature (T) is a turbine exit temperature (ATK) or a computationally determined turbine inlet temperature.

Furthermore, the objects upon which the invention is based are achieved by means of an operating method for a gas turbine during partial load, comprising the following steps: —specifying a setpoint value of a temperature at a predetermined power output; —determining two operating curves of the temperature as a function of the power output of the gas turbine, wherein the setpoint value of the temperature is arranged between these operating curves (FL); —determining the difference of the temperatures of these two operating curves at the essentially constant, predetermined power output; —determining a deviation of the predetermined setpoint value of the temperature from the temperature of one of the two operating curves at the essentially constant, predetermined power output; —calculating an interpolated operating curve deviation on the basis of the difference of the temperatures and the deviation of the setpoint value of the temperature, wherein the temperature (T) is a turbine exit temperature (ATK) or a computationally determined turbine inlet temperature.

Furthermore, the objects upon which the invention is based are achieved by means of a gas turbine control system comprising a control unit, wherein the control unit is designed to implement a method as described above and also below.

The objects upon which the invention is based are also achieved by means of a gas turbine comprising such a gas turbine control system.

According to the invention, an operating curve is initially to be understood as a function of the temperature from the power output wherein a fixed parameter set is associated with each operating curve. Alternatively, an operating curve can also be understood as a function of the power output from a temperature. Within the context of the further clarifications, however, no distinction shall explicitly be made between these two cases. In particular, if the respective functions are clear, a distinction is not necessary anyway.

The operating curves, in addition to a temperature which is relevant to the power operation of the gas turbine and can also be used for power output determination of the gas turbine, therefore also feature a power output which is delivered by the gas turbine during the partial load operation. Furthermore, the operating curves, however, also feature operating parameters which especially relate to the fuel distribution, wherein the parameters establish how much fuel is to be proportionally fed to the individual burners of the gas turbine or to burner stages. Typically, these parameter sets differ with regard to the fuel distribution of two different operating curves, also to the effect that the relative distribution of fuel to the individual burners or burner stages varies. Therefore, if a change is made between two operating curves by the gas turbine control system, not only the operating parameter of the power output or temperature is varied but also for example the proportional fuel distribution to the individual burners and burner stages. Moreover, the operating curves can also differ as a result of varying compressor guide vane positions.

In particular, the fuel distribution between the individual burners or burner stages ensures a stable overall combustion along an operating curve during operation. If, however, a change is now to be made between the two operating curves, new parameter sets would be used in the gas turbine control system in each case so that during the change between two operating curves the relative proportion of fuel between the individual burners or burner stages would also vary.

The present invention now proposes, during a change between two such operating curves, to specify a suitable power output setpoint value or setpoint value of a temperature which is arranged between the two operating curves. In order to now be able to ensure a stable operation of the gas turbine, the power output difference or the difference of the temperatures of the two operating curves are initially determined and in a certain manner held in readiness as a maximum power output difference or maximum difference of the temperatures. Similarly, from one of the operating curves, typically the operating curve provided for the current operation of the gas turbine, the distance to the respective power output setpoint value or to the setpoint value of the temperature is determined and from these values a suitable power output deviation or power output deviation of the predetermined setpoint value of the temperature is calculated. On the basis of the calculated power output differences and power output deviations or on the basis of the differences of the temperatures and the deviation of the setpoint value of the temperatures, an intermediate value for the power output setpoint value or the setpoint value of the temperature can now be calculated, which the gas turbine control system can take into consideration for the operation of the gas turbine. This intermediate value is produced from an interpolated operating curve deviation from which new intermediate parameter values are also calculated in each case for the individual parameters which are covered by the respective operating curves.

The calculation of the interpolated operating curve deviation therefore serves for also being able to ensure a stable operation of the gas turbine for the calculated intermediate values. Since the interpolated operating curve deviation according to the invention now also includes a correspondingly interpolated parameter set for the respective operating parameters, the gas turbine control system can therefore also access intermediate states during a change between two operating curves which help to avoid an unstable operating state directly resulting due to the abrupt change between the two operating curves. According to the invention, the gas turbine is therefore adjusted at least by establishing a further intermediate value between the two operating curves instead of a jump between said two operating curves. In this way, the occurrence of undesirably high jumps between the individual operating parameters, which are associated with the operating curves, can be prevented, and consequently an unnecessarily sharp discontinuity during operation of the gas turbine can be avoided.

The interpolation according to the invention can in this case be calculated by means of various mathematical processes, wherein, however, a linear interpolation of the individual identical parameters constitutes the simplest and most advantageous solution. In other words, the individual operating parameters, which are for example associated with the two operating curves at a predetermined temperature value or at a predetermined power output value, are interpolated insofar as the individual operating parameters are obtained by means of a simple calculation in a rule of three equation for calculating an intermediate state.

The determination of the interpolated operating curve deviation especially also includes a determination of the fuel distribution at the power output setpoint value or at the setpoint value of the temperature. This typically differs from the fuel distribution in one of the two operating curves since both operating curves typically have different fuel distributions. The interpolated operating curve deviation, therefore, comparable for example to an operating curve, is to be understood as a set of operating parameters which for example in addition to the relevant temperature and the power output also include operating parameters with regard to the fuel distribution or to the air quantity (position of the guide vanes of a compressor inlet guide baffle). If, moreover, water is additionally injected into the gas turbine for power augmentation, the interpolated operating curve deviation, in common with the operating curves, can also additionally have operating parameters which determine more specifically the quantity and distribution of the injected water.

At this point, it is again to be noted that the temperature values which are predetermined according to the invention relate in this case to such temperatures which are considered as being relevant to the operation of the gas turbine and to its controlling. These are especially measured as well as calculated temperatures which occur in the flow passage of the gas turbine during its operation. Therefore, for example the exit temperatures at the expansion turbine (ATK) or the turbine inlet temperatures (TT1) are such temperatures. These temperatures can for example be determined even more accurately by means of suitable calculation processes in order to be able to also take into consideration for example the feed of secondary air into or downstream of the combustion chamber. The predetermined temperature values are therefore of relevance with regard to the power output determination.

The power output according to the invention relates to the power output delivered by the gas turbine during operation, which can also be referred to as the load.

In order to also be able to operate a gas turbine, which for example is operated along a first operating curve, in the sense according to the invention, the interpolated operating curve deviation calculated by means of the invention is typically associated with one of the two operating curves, typically with the operating curve which is currently in use in the control system of the gas turbine, as a result of which a new modified operating curve results. Essential to this new modified operating curve, however, is at least one intermediate state which is specified by a power output setpoint value or a setpoint value of the temperature, wherein the setpoint values in question are not covered by one of the two operating curves which are already stored in a previously specified state in the control system of the gas turbine.

According to the invention, it is provided that the temperature is a turbine exit temperature. These turbine exit temperatures can in this state be measured (typically also referred to as TT2) as well as calculated turbine exit temperatures. These can especially also be turbine exit temperatures computationally corrected by thermodynamic effects such as the secondary air feed or discharge. These temperatures are typically available anyway within the control system of a gas turbine so that the definition of operating curves and of the intermediate states which are to be determined can easily be carried out. Alternatively, the computationally determined turbine inlet temperature can also be used for determining the temperature.

According to a further, especially advantageous embodiment of the invention, it is provided that one of the two operating curves is the operating curve which is currently in use in the control system of the gas turbine. Use is available in this case when the operating curve in question is provided as the control basis of parameters used in the gas turbine.

In accordance with an especially advantageous embodiment of the invention, it is provided that the interpolated operating curve deviation is calculated by means of a linear interpolation. Alternative approaches would be either a weighted interpolation or an interpolation by polygon curves which can be generated according to corresponding criteria. The linear interpolation, however, can easily be computationally determined as a simple deviation value which for example can be calculated in a rule of three equation. This thereby calculated difference, which can also be referred to as a delta difference, can then be associated with the operating curve currently in use so that a new operating reference value can be determined for the further operation of the gas turbine.

According to a further especially advantageous embodiment of the invention, it is provided that the interpolated operating curve deviation takes into consideration, or also includes, a change of the compressor guide vane position. A change of the compressor guide vane position can in this case also already be taken into consideration in the calculation of the power output difference of the two operating curves or in the determination of the difference of the temperatures of the two operating curves. In other words, operating curves which in their operating parameters also include different values which characterize the position of the compressor guide vanes can also be taken into consideration in this way. In this respect, changes between operating curves, which specify the different positions of the compressor guide vanes, can also be made in a flexible manner.

According to a further especially advantageous embodiment of the invention, it is provided that the following step is also included:—determining a set of individual fuel quantities which are fed to a multiplicity of burners or burner stages of the gas turbine, taking into consideration the interpolated operating curve deviation (IFA).

The set of individual fuel quantities can in this case relate to a multiplicity of burners or also to a multiplicity of burner stages. In other words, in the calculation of the interpolated operating curve deviation the distribution of the individual fuel quantities to the multiplicity of burners is also re-determined. In this respect, the interpolated operating curve deviation can also serve for the determination of a correction value to a currently established fuel quantity for a predetermined number of burners or burner stages. In order to now operate the gas turbine according to this embodiment, the interpolated operating curve deviation, that is to say the correction value, would be associated for example with an operating curve currently in use, as a result of which by the suitable mathematical linking of the current operating curve with the interpolated operating curve deviation, for example by addition, the individual fuel flow which is actually to be established for the multiplicity of burners or burner stages can be calculated.

The invention shall be more fully described in detail below with reference to individual figures. In this case, the invention is shown only schematically, as a result of which, however, no limitation of the practicability of the invention results.

Reference is also to be made to the fact that all the following technical features which are provided with the same designations have the same technical function.

By the same token, reference is to be made to the fact that each optional combination of the subsequently described technical features is claimed providing this combination can achieve the object upon which the invention is based.

DETAILED DESCRIPTION OF INVENTION

Figure 1:
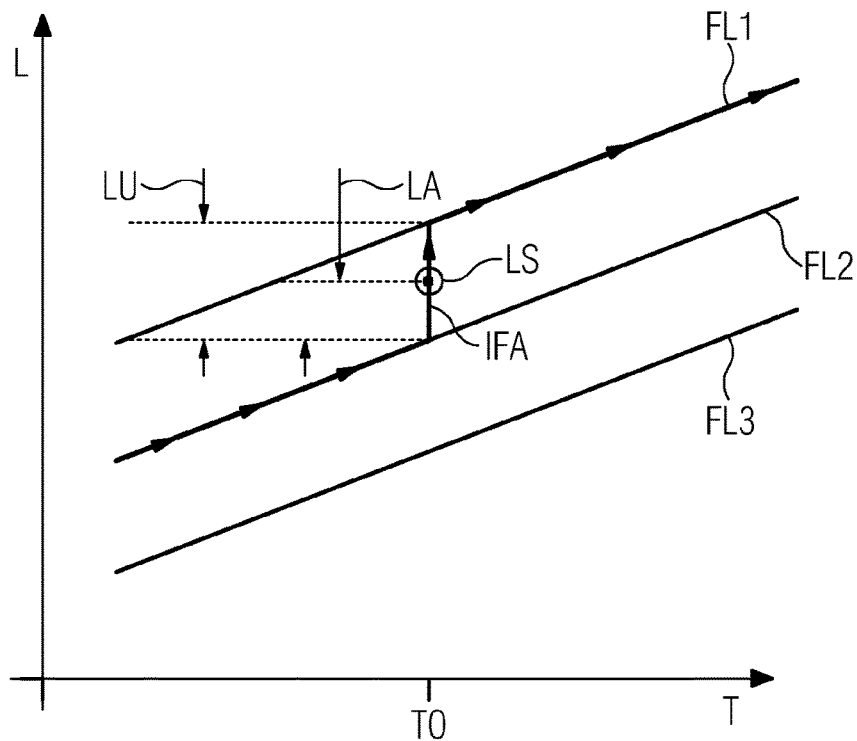
FIG. 1 shows a schematic view in diagram form of the slope of different operating curves for operating a gas turbine, and also of the determination of a power output setpoint value according to a first embodiment of the invention.

FIG. 1 shows a schematic view in diagram form of a number of operating curves FL1, FL2, FL3 for operating a gas turbine, which run largely parallel to each other. The operating curves FL1, FL2, FL3 can be described as a function of the temperature T in dependence of the power output L of the gas turbine 1 (not shown in the present case) or also as a function of the power output L in dependence of the temperature T. The depicted operating curves FL1, FL2, FL3 have in this case a uniform increase of the power output L with increasing temperature T. Such an operating curve slope is typically distinguished for example by increased feed of fuel to the individual burners or burner stages of the gas turbine 1. In other words, the operating curves FL1, FL2 and FL3 are easily described by for example only the total quantity of fuel being increased with already existing and established distribution of the individual proportionate fuel quantities for the burners or burner stages of the gas turbine 1.

The individual operating curves FL1, FL2, FL3, however, can differ to the effect that the proportionate quantities of individual fuel flows which are fed to the individual burners or burner stages of the gas turbine differ. If, therefore, for example an operating change in the middle of an operation which uses the operating curve FL2 as a reference value is to be carried out to the effect that the operating curve FL1 is now to be used as a reference value, a corresponding change of the respectively associated parameter set would have to be undertaken in the control system of the gas turbine 1. Since the operating curves FL1 and FL2 also differ with regard to the proportionate quantities of fuel to the individual burners or burner stages, this would bring about a sometimes comparatively sharp jump in the distribution change of the fuel, which can transfer the gas turbine into an unstable operating state. In order to prevent this, a power output setpoint value LS which is arranged between the two operating curves FL1 and FL2 is now to be determined. In order to determine this power output setpoint value LS more specifically, according to one embodiment of the invention an interpolation which calculates the corresponding operating parameters for the power output setpoint value LS is undertaken. To this end, at a predetermined temperature TO, which during this process is not supposed to change, or not supposed to change significantly, a power output difference LU which exists between the two operating curves FL2 and FL1 at the basically constant, predetermined temperature value TO is determined. Similarly, a power output deviation LA of the predetermined power output setpoint value LS from the second operating curve FL2 at the basically constant, predetermined temperature value TO is also determined. With the aid of these two values of the power output difference LU and the power output deviation LA, an interpolated operating curve deviation IFA can now be determined via a simple rule of three calculation, which curve deviation virtually includes all the operating parameters for an operating curve FL, but makes reference to an intermediate position between the two operating curves FL1 and FL2. If this interpolated operating curve deviation IFA is now additionally computationally associated for example with the second operating curve FL2, a new operating curve slope can be defined and connects for example the operating curve 2 to the operating curve 1 (see the highlighted areas of the respective operating curves).

By determining such a power output setpoint value LS, an intermediate state can therefore be initiated during a change between the operating curves FL2 and FL1, which intermediate state allows a comparatively more stable intermediate operation to be undertaken during a change of the controlled operation. Naturally, it is also conceivable that a larger number, a multiplicity, of different power output setpoint values between the respective operating curves FL1 and FL2 are determined. Accordingly, it can therefore be calculated that the thereby established gas turbine operation can be carried out in an even more stable manner. In other words, by calculating one or more power output setpoint values between the operating curves FL1 and FL2 a new overall operating curve can be defined and can be used as a suitable reference value within the scope of the gas turbine control system. In this case, it is also conceivable that the thereby calculated intermediate states are not only different with regard to the parameters of the proportionate individual fuel quantity flows but for example also different with regard to the guide vane positions. Especially the transition between the operating curves FL2 and FL1, shown in FIG. 1, which indeed is carried out at the basically constant, predetermined temperature TO, that is to say with a basically unaltered fuel mass flow, is typically also undertaken as a result of a change of the compressor inlet guide vane positions in addition to a change of the proportionate fuel flows to the individual burners or burner stages.

Figure 2:
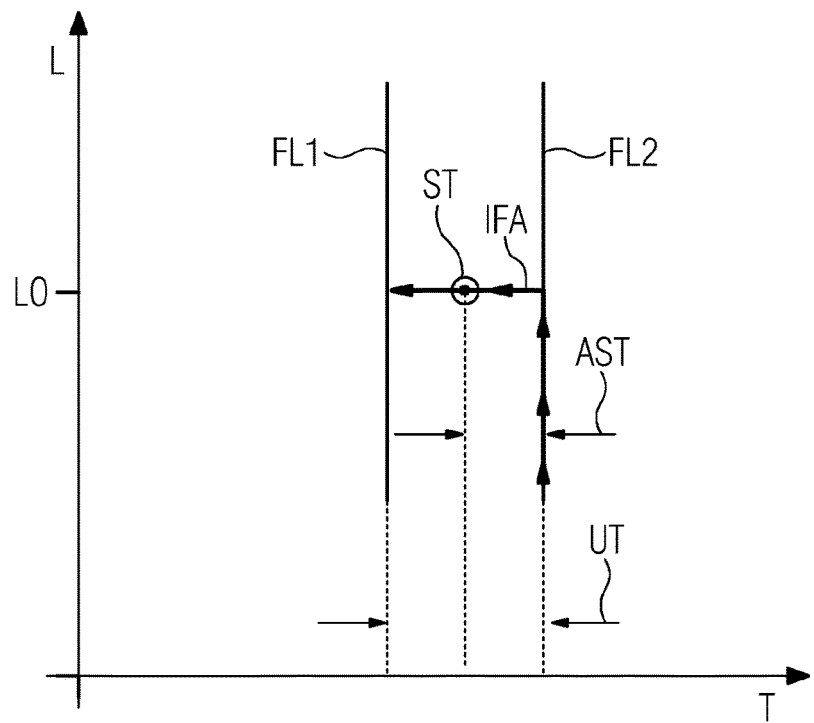
FIG. 2 shows a further schematic view in diagram form of different operating curves for operating a gas turbine, taking into consideration a setpoint value of a temperature, according to a further embodiment of the invention.

This situation is different during a change of the gas turbine operation between an operating curve FL2 and an operating curve FL1, as shown in FIG. 2. If the operating curves FL1 and FL2 are specified basically at invariable temperature values, wherein only the associated power output values are altered, by an adjustment of the compressor inlet guide vanes practically no change between the two operating curves FL1 and FL2 is carried out. Since in essence the total fuel mass flow is responsible for the creation of the relevant temperatures (e.g. turbine exit temperatures), the currently shown change between the operating curve FL2 and the operating curve FL1 requires the specifying of a setpoint value ST of a temperature T which is arranged between the two operating curves FL2 and FL1. For calculating the interpolated operating curve deviation IFA, a difference is calculated in turn, but this time between the temperatures of the two operating curves at the basically constant, predetermined power output L0. Moreover, a deviation AST of the predetermined setpoint value ST of the temperature T from the temperature T of the operating curve FL2 at a basically constant, predetermined power output L0 is calculated. In turn, by means of a rule of three equation the interpolated operating curve deviation IFA can be calculated from these two values of the deviation AST of the predetermined setpoint value ST of the temperature T and of the difference UT of the temperature T.

The further principles when determining the setpoint value ST of a temperature T correspond in this case to the principles as under FIG. 1 for determining the power output setpoint value LS. The transition between the two operating curves FL2 and FL1, on the other hand, is brought about in the first instance by a change of the total fuel mass flow which is fed to the individual burners or burner stages of the gas turbine 1 (not shown in the present case).

Figure 3:
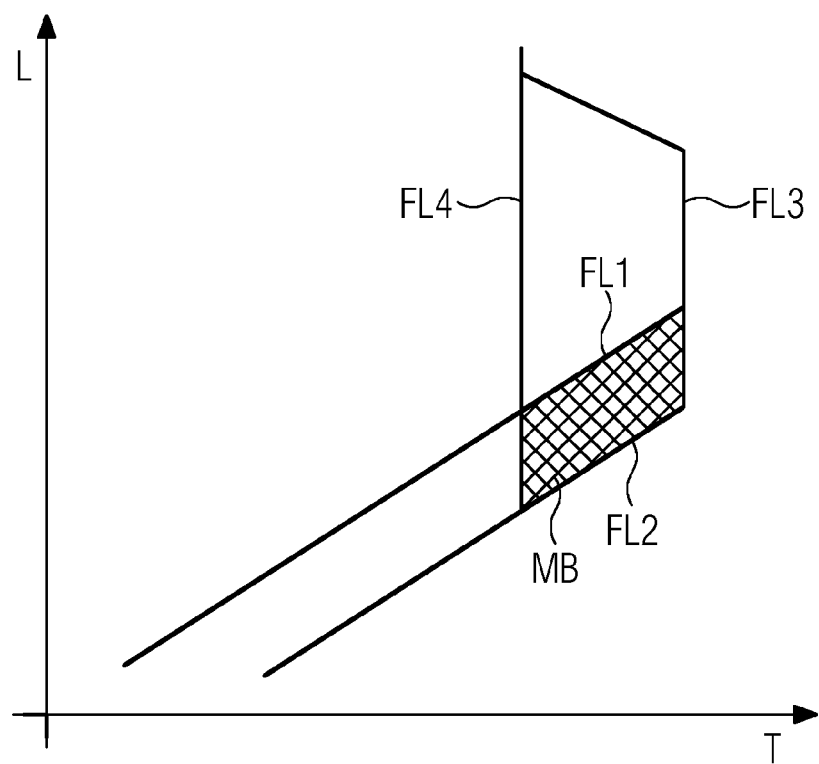
FIG. 3 shows a further schematic view in diagram form of a slope of different operating curves for determining a power output setpoint value or setpoint value of a temperature according to a further embodiment of the invention.

FIG. 3 shows a further diagrammatic view of different operating curves FL1, FL2, FL3 and FL4, wherein the cases shown in FIGS. 1 and 2 are now combined. By combining the cases, a mixed region MB is produced in the region of the transition between the operating curves FL1, FL2 and FL3, FL4 and is shown in a chequered pattern. Whereas the transition from the operating curve FL2 to the operating curve FL1 via the power output setpoint value LS, shown in FIG. 1, can be achieved in the main by means of an adjustment of the compressor inlet guide vanes and the transition between the operating curve FL2 and FL1 according to FIG. 2 can be achieved in the main by means of a change of the total fuel mass flow, wherein the setpoint value ST of the temperature T is taken into consideration, in the mixed region MB a combination of adjustment of the total fuel mass flow and compressor inlet guide vane adjustment can now be carried out in order to optionally make a change between the individual operating curves. The adjustment of total fuel mass flow and compressor inlet guide vane position can in this case be carried out basically at the same time.

Further embodiments are gathered from the dependent claims.

The invention claimed is:

1. An operating method for a gas turbine during partial load operation, comprising the following steps:
    specifying a setpoint value of a first parameter at a predetermined value of a second parameter different from the first parameter, wherein the first parameter is one of a temperature and a power output of the gas turbine and wherein the second parameter is one of the temperature and the power output;
    determining two operating curves of the temperature or power output as a function of the respective power output or temperature of the gas turbine, wherein the setpoint value of the first parameter is arranged between these operating curves;
    determining the difference of the first parameter of these two operating curves at the essentially constant, predetermined value of the second parameter;
    determining a deviation of the predetermined set point value of the first parameter from one of the two operating curves at the essentially constant, predetermined value of the second parameter;
    calculating an interpolated operating curve deviation on the basis of the difference of the first parameter and the deviation of the setpoint value of the first parameter, wherein the interpolated operating curve deviation has a slope that connects the two operating curves, and
    operating, with a control system, the gas turbine according to the interpolated operating curve deviation while switching between the two operating curves,
    wherein the temperature is a turbine exit temperature or a computationally determined turbine inlet temperature, and
    wherein the operating according to the interpolated operating curve deviation is after operation at one of the two operating curves and prior to operation at another of the two operating curves.

2. The operating method as claimed in claim 1, wherein the first parameter is the power output and the second parameter is the temperature.

3. The operating method as claimed in claim 2,
    wherein one of the two operating curves is the operating curve currently in use in the control system of the gas turbine.

4. The operating method as claimed in claim 2,
    wherein the interpolated operating curve deviation is calculated by a linear interpolation.

5. The operating method as claimed in claim 2,
    wherein the interpolated operating curve deviation takes into consideration, or also includes, a change of the compressor guide vane position.

6. The operating method as claimed in claim 2, further comprising:
    determining a set of individual fuel quantities which are fed to a multiplicity of burners or burner stages of the gas turbine, taking into consideration the interpolated operating curve deviation.

7. A gas turbine control system, comprising:
    a control unit,
    wherein the control unit is designed to implement a method as claimed in claim 2.

8. A gas turbine comprising:
    a control system as claimed in claim 7.

9. The operating method as claimed in claim 2, wherein the calculating the interpolated operating curve deviation comprises calculating the interpolated operating curve deviation at the predetermined value of the temperature.

10. The operating method as claimed in claim 1, wherein the first parameter is the temperature and the second parameter is the power output.

11. The operating method as claimed in claim 10,
    wherein one of the two operating curves is the operating curve currently in use in the control system of the gas turbine.

12. The operating method as claimed in claim 10,
    wherein the interpolated operating curve deviation is calculated by means of a linear interpolation.

13. The operating method as claimed in claim 10,
    wherein the interpolated operating curve deviation takes into consideration, or also includes, a change of the compressor guide vane position.

14. The operating method as claimed in claim 10, further comprising:
    determining a set of individual fuel quantities which are fed to a multiplicity of burners or burner stages of the gas turbine, taking into consideration the interpolated operating curve deviation.

15. A gas turbine control system, comprising:
    a control unit,
    wherein the control unit is designed to implement a method as claimed in claim 10.

16. A gas turbine comprising:
    a control system as claimed in claim 15.

17. The operating method as claimed in claim 10, wherein the calculating the interpolated operating curve deviation comprises calculating the interpolated operating curve deviation at the predetermined value of the power output.

18. The operating method as claimed in claim 1, further comprising determining a distribution of individual fuel quantities to a multiplicity of burners of the gas turbine based on the interpolated operating curve.

19. The operating method as claimed in claim 1, wherein the determining two operating curves of the temperature as a function of the power output of the gas turbine comprises determining four operating curves of the temperature as a function of the power output, wherein the four operating curves are combined to form a mixed region in a region of transition between the said four operating curves, and wherein a transition from a first operating curve to a second operating curve among the four operating curves is achieved by at least one of adjustment of compressor inlet guide vanes of the gas turbine and adjustment of a total fuel mass flow to the gas turbine based on the interpolated operating curve deviation.

* * * * *